(12) United States Patent
Anchan et al.

(10) Patent No.: US 11,151,341 B2
(45) Date of Patent: Oct. 19, 2021

(54) METHOD AND DEVICE FOR DETERMINING OBJECT ORIENTATION

(71) Applicant: ZEBRA TECHNOLOGIES CORPORATION, Lincolnshire, IL (US)

(72) Inventors: Dikshith Anchan, Benagaluru (IN); Deepak Ayyagari, Bangalore (IN); Thyagarajan Udaykumar, Bangalore (IN); Vattem Manohar Reddy, Ananthapur (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/596,708

(22) Filed: Oct. 8, 2019

(65) Prior Publication Data

US 2021/0103710 A1   Apr. 8, 2021

(51) Int. Cl.
*G06K 7/10* (2006.01)
*G06K 7/14* (2006.01)
*G06K 19/06* (2006.01)

(52) U.S. Cl.
CPC ....... *G06K 7/10554* (2013.01); *G06K 7/1413* (2013.01); *G06K 7/1417* (2013.01); *G06K 19/06028* (2013.01); *G06K 19/06037* (2013.01)

(58) Field of Classification Search
CPC .. G06K 7/1413; G06K 7/1417; G06K 7/1452; G06K 7/1456; G06K 19/06028; G06K 19/06037; G06K 2019/06262; G06K 7/10861; G06K 2007/10504
See application file for complete search history.

(56) References Cited

U.S. PATENT DOCUMENTS

| | | | | |
|---|---|---|---|---|
| 4,075,461 A * | 2/1978 | Wu | ...................... | G06K 7/0166 235/431 |
| 4,879,456 A * | 11/1989 | Cherry | ..................... | G06K 7/14 235/462.07 |
| 5,512,739 A * | 4/1996 | Chandler | ............. | G06K 7/1093 235/454 |
| 5,635,697 A * | 6/1997 | Shellhammer | .......... | G06F 3/002 235/462.11 |
| 10,025,968 B2 * | 7/2018 | Zumsteg | .......... | G06K 19/07758 |
| 2004/0155110 A1 * | 8/2004 | Ehrhart | .................. | G06K 9/228 235/469 |
| 2016/0210490 A1 * | 7/2016 | Li | ........................ | G06K 7/1443 |

* cited by examiner

*Primary Examiner* — Suezu Ellis

(57) ABSTRACT

A barcode scanning device for determining an object orientation of an object includes: a barcode reader; a decoding processor interconnected with the barcode reader, the decoding processor configured to: control the barcode reader to read the barcode and generate barcode data representing the barcode; and an orientation processor interconnected with the decoding processor, the orientation processor configured to: receive the barcode data and determine a barcode orientation based on the barcode data; determine the object orientation based on the barcode orientation; and output an indication of the object orientation.

17 Claims, 6 Drawing Sheets

METHOD AND DEVICE FOR DETERMINING OBJECT ORIENTATION

BACKGROUND

Items, such as food and liquid items, electronic goods, fragile items, and medicines may be prone to damage and/or leakage if packages in which such items are stored are incorrectly oriented during handling. When these items are packaged, however, it may be difficult to identify whether the items are correctly oriented.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
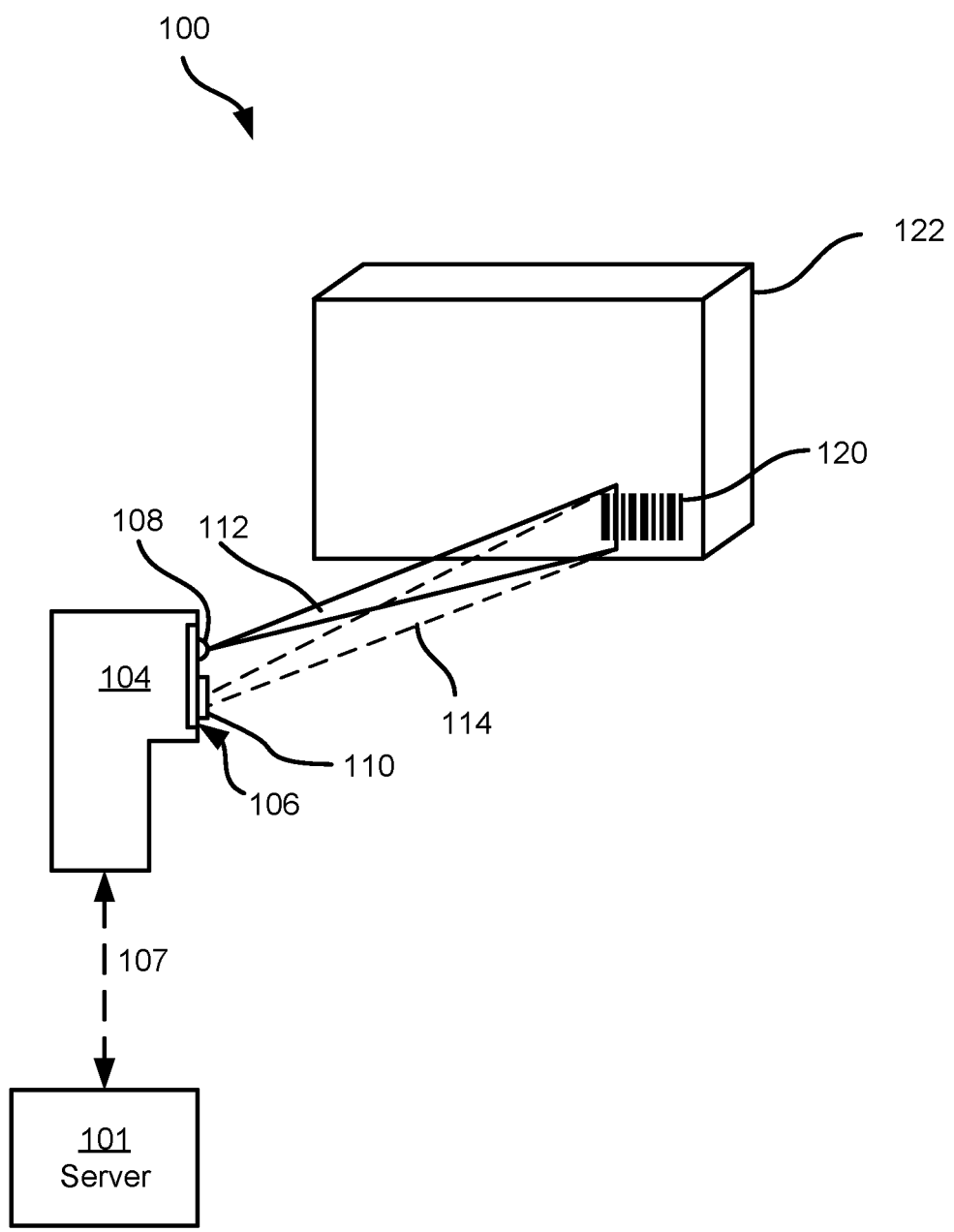
FIG. 1 is a schematic of a barcode scanning system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a barcode scanning device comprising: a barcode reader disposed on the device, the barcode reader configured to read a barcode and generate barcode data representing the barcode; a decoding processor disposed in the device and interconnected with the laser and the sensor, the decoding processor configured to control the barcode reader to read the barcode and generate the barcode data; and an orientation processor interconnected with the decoding processor, the orientation processor configured to: receive the barcode data and determine a barcode orientation based on the barcode data; determine an object orientation based on the barcode orientation; and output the object orientation.

Additional examples disclosed herein are directed to a method of determining an object orientation of an object, the method comprising: reading a barcode and generating barcode data representing the barcode; determining a barcode orientation based on the barcode data; determining the object orientation based on the barcode orientation; and outputting the object orientation.

Additional examples disclosed herein are directed to a non-transitory computer-readable medium storing a plurality of computer-readable instructions executable by a controller, wherein execution of the instructions configures the controller to: read a barcode and generating barcode data representing the barcode; determine a barcode orientation based on the barcode data; determine the object orientation based on the barcode orientation; and output an indication of the object orientation.

FIG. 1 depicts a barcode scanning system 100 in accordance with the teachings of this disclosure. The system 100 includes a server 101 in communication with a barcode scanning device 104 (also referred to herein as simply the device 104) via a communication link 107, illustrated in the present example as including wireless links. For example, the link 107 may be provided by a wireless local area network (WLAN) deployed by one or more access points (not shown). In other examples, the server 101 is located remotely from the barcode scanning device 104 and the link 107 may therefore include one or more wide-area networks such as the Internet, mobile networks, and the like.

The system 100 is deployed, in the illustrated example, to scan a barcode 120 on an object 122, such as a box or a package. In particular, the device 104 includes a barcode reader 106. In the present example, the barcode reader 106 is a laser scanner and includes a laser 108 and a sensor 110. The laser 108 is disposed on the device 104 and is configured to emit a laser beam 112 in a direction in which the device 104 is oriented for scanning. In the illustrated example, the laser 108 is therefore configured to scan the laser beam 112 across the barcode 120. For example, the laser 108 may emit a laser beam 112 forming a plane to be scanned across the barcode 120. The sensor 110 is disposed on the device 104 and is configured to detect a reflected signal 114 from the laser beam 112. In particular, the laser beam 112 will reflect differently based on the bars, blocks, and/or spaces of the barcode, hence the reflected signal 114 represents the barcode. In other example embodiments, the barcode reader 106 may be a camera-based barcode reader, and hence may include an image sensor for capturing image data representing the barcode 120 and applying imaging processing techniques to read the barcode 120.

Figure 2:
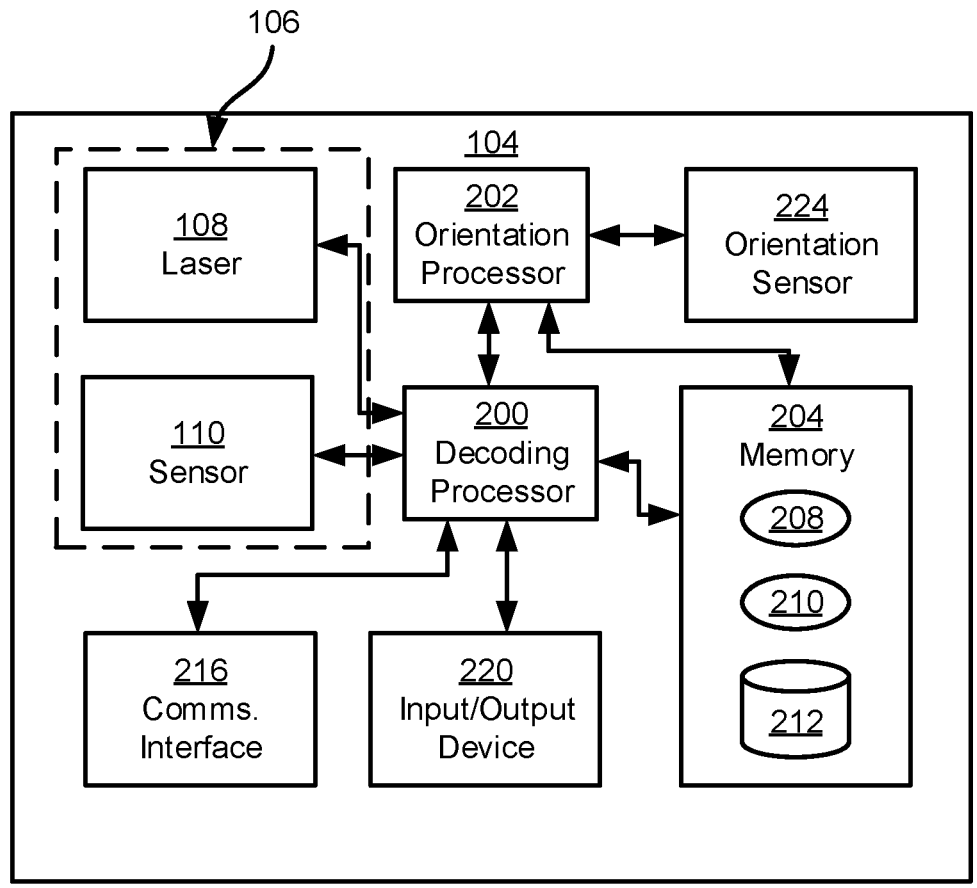
FIG. 2 is a block diagram of certain internal hardware components of the barcode scanning device of FIG. 1.

Referring to FIG. 2, the barcode scanning device 104, including certain internal components, is shown in greater detail. The device 104 includes a decoding processor 200 interconnected with a non-transitory computer-readable storage medium, such as a memory 204. The device 104 further includes an orientation processor 202 interconnected with the decoding processor 200 and with the memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The decoding processor 200, the orientation processor 202 and the memory 204 each comprise one or more integrated circuits.

The memory 204 stores computer-readable instructions for execution by the decoding processor 200 and the orientation processor 202. In particular, the memory 204 stores a control application 208 which, when executed by the decoding processor 200, configures the decoding processor 200 to perform various functions discussed below in greater detail and related to the barcode scanning operation of the device 104. The application 208 may also be implemented as a suite of distinct applications. The decoding processor 200, when so configured by the execution of the application 208, may also be referred to as a controller 200. The memory 204 further stores an orientation application 210 which, when executed by the orientation processor 202, configures the orientation processor 202 to perform various functions discussed below in greater detail and related to the orientation determination operation of the device 104. The application 210 may similarly be implemented as a suite of distinct applications. In some embodiments, the orientation processor 202 may be integrated with the decoding processor 200, and hence the decoding processor 200 may perform the orientation determination operations in addition to the barcode scanning operations of the device 104.

Those skilled in the art will appreciate that the functionality implemented by the decoding processor 200 and the orientation processor 202 may also be implemented by one or more specially designed hardware and firmware components, such as a field-programmable gate array (FPGAs), application-specific integrated circuits (ASICs) and the like in other embodiments. In an embodiment, the decoding processor 200 and the orientation processor 202 may be, respectively, a special purpose decoding processor and a special-purpose orientation processor which may be implemented via dedicated logic circuitry of an ASIC, an FPGA, or the like in order to enhance the processing speed of the decoding and orientation determination operations discussed herein.

The memory 204 also stores a repository 212 containing, for example, barcode scanning data including object identifiers, logs, and the like. The repository 212 may further include predefined coding rules, and barcode placement guidelines for use in the orientation determination operations discussed herein.

The device 104 also includes a communications interface 216 interconnected with the decoding processor 200. The communications interface 216 includes suitable hardware (e.g. transmitters, receivers, network interface controllers and the like) allowing the device 104 to communicate with other computing devices—particularly the server 101—via the link 107. The specific components of the communications interface 216 are selected based on the type of network or other links that the device 104 is required to communicate over. The device 104 can be configured, for example, to communicate with the server 101 via the link 107 using the communications interface to send and receive barcode scanning data to the server 101.

As shown in FIG. 2, the decoding processor 200 is interconnected with the barcode reader 106, and in particular, with the laser 108 and the sensor 110. The decoding processor 200 is enabled, via such connections, to issue commands for performing a barcode scanning and decoding operation. Specifically, the decoding processor can control the laser 108 to scan the laser beam 112 across the barcode 120, and the sensor 110 to detect the reflected signal 114 for generating barcode data representing the barcode. The decoding processor 200 is also connected to one or more input and/or output devices 220. The input devices 220 can include one or more buttons, keypads, touch-sensitive display screens or the like for receiving input from an operator. The output devices 220 can further include one or more display screens, sound generators, vibrators, or the like for providing output or feedback to an operator.

The device 104 can further include an orientation sensor 224, such as an accelerometer, a gyroscope, a combination of accelerometer(s) and gyroscope(s) such as an inertial measurement unit (IMU), or the like. The orientation sensor 224 is configured to determine an orientation of the device 104 relative to the earth and provide a device orientation to the orientation processor 202 and/or the decoding processor 200.

Figure 3:
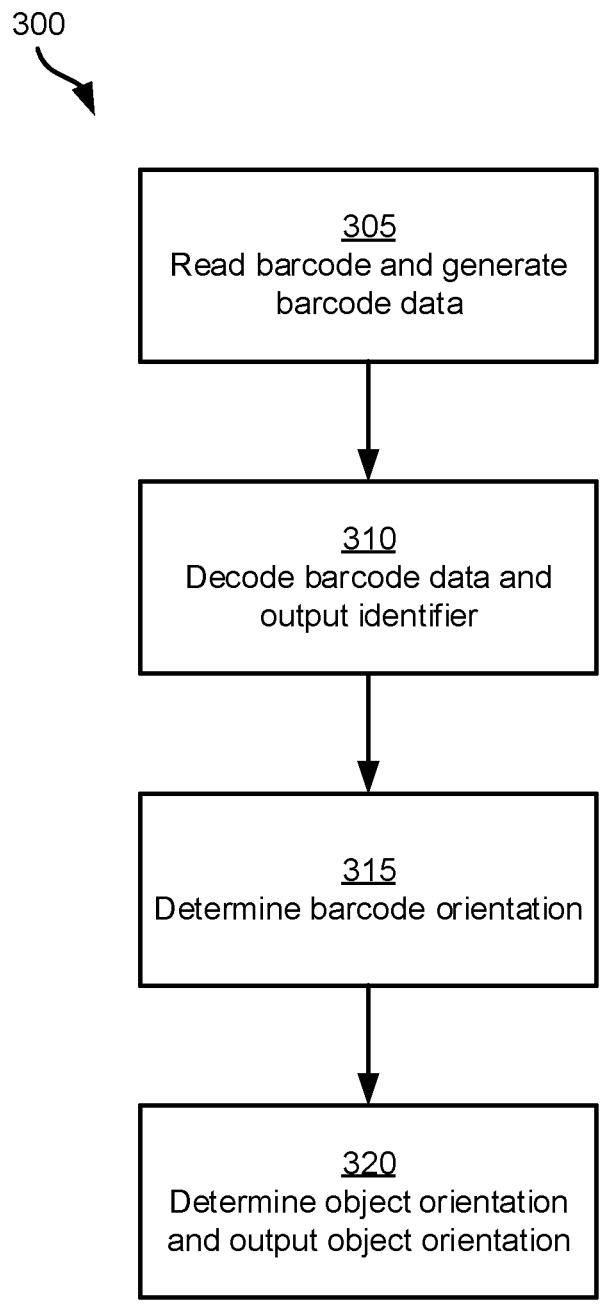
FIG. 3 is a flowchart of a method for determining object orientation.

The functionality of the device 104, as implemented via execution of the applications 208 and 210 by the decoding processor 200 and the orientation processor 202 will now be described in greater detail, with reference to FIG. 3. FIG. 3 illustrates a method 300 of determining an object orientation of an object, which will be described in conjunction with its performance in the system 100, and in particular by the device 104, with reference to the components illustrated in FIGS. 1 and 2.

The method 300 begins at block 305 in response to an initiation signal, such as an input at the input/output device 220. For example, an operator may trigger a trigger button to initiate the method 300. At block 305, the device 104 is configured to read the barcode 120 to generate barcode data representing the barcode 120. For example, the device 104 may be configured to scan, from the laser 108, the laser beam 112 across the barcode 120, and detect, at the sensor 110, the reflected signal 114 to generate the barcode data. In other examples, the device 104 may be configured to capture, at the barcode reader 106, image data representing the barcode 120 for applying image processing techniques to obtain the barcode data representing the barcode 120.

At block 310, the device 104, and in particular the decoding processor 200, is configured to decode the barcode data to extract an identifier encoded by the barcode 120. In particular, the decoding processor 200 may decode the barcode data based on predefined coding rules defining how data is encoded into the barcode 120, as is known in the art. For example, the decoding processor 200 may analyze the widths of the spaces and bars in a 1-dimensional or linear barcode to extract the encoded characters. In another example, the decoding processor 200 may analyze the patterns of blocks in a 2-dimensional or matrix barcode to extract the encoded data.

The identifier can be one or more of an item identifier (e.g. a product identifier or SKU code), a manufacturer identifier, or the like. In some examples, the device 104 may be configured to communicate, via the communications interface 216, the extracted data to the server 101 for further processing. For example, the device 104 may retrieve a destination for a package, various sorting criteria, or the like, from the server 101 based on the identifier encoded in the barcode 120. In other examples, the device 104 may simply send the extracted data to the server 101 for logging in a database. In some embodiments, the device 104 may be further configured, at block 310, to display the identifier, or the retrieved data, such as the destination, on a display screen of the device 104.

At block 315, the device 104, and in particular, the orientation processor 202 is configured to determine a barcode orientation based on the barcode data.

Figure 4:
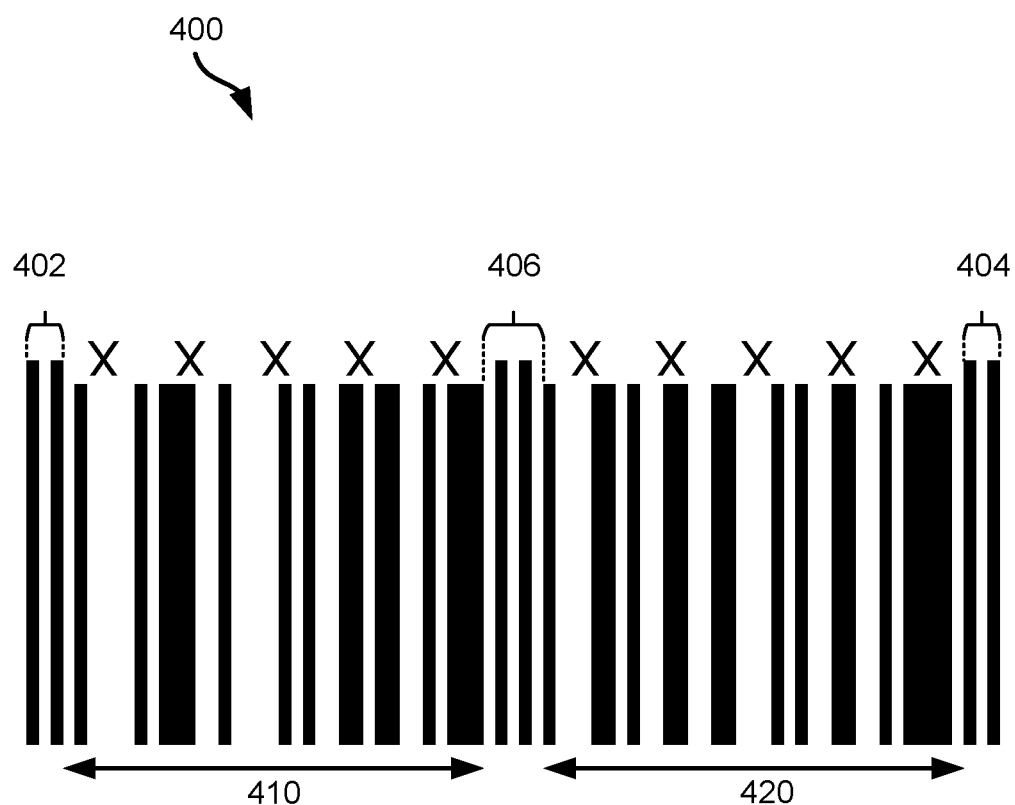
FIG. 4 is a schematic of a linear barcode.

For example, referring to FIG. 4, an example barcode 400 is depicted. In the illustrated example, the barcode 400 is a 1-dimensional or linear barcode which is inverted. The barcode 400 includes a first end guard 402, a second end guard 404, and a center guard 406 separating a first portion 410 of the barcode from a second portion 420 of the barcode. In particular, the first portion 410 may be the first set of bars in the barcode data, or the left-most region in an image, and may not correspond with a left portion of the barcode 400, for example, when the barcode 400 is inverted, as in the present example. Thus, the orientation processor 202 identifies the first portion 410 based on the first end guard 402 and the center guard 406. Similarly, the orientation processor identifies the second portion 420 between the center guard 406 and the second end guard 404.

The orientation processor 202 may then determine whether the first portion 410 corresponds to the left portion (i.e. the portion that is on the left side of the center guard when the barcode is upright) of the barcode. In particular, the left portion and a right portion of the barcode 400 may use different predefined coding rules by which to encode the digits or data in the barcode 400. For example, the barcode 400 is encoded with the Universal Product Code (UPC) encoding, in which digits in the left portion have odd parity, while digits in the right portion have even parity. That is, the number of 1s or bars for encoding digits is odd in the left portion and even in the right portion. Thus, to determine the barcode orientation, the orientation processor may determine whether the first portion 410 adheres to the predefined coding rules for the left portion. For example, if the first portion 410 has an odd number of 1s or bars, then the orientation processor 202 may determine that the first portion 410 corresponds to the left portion, and hence the barcode orientation is upright relative to the device 104. If, as in the present example, the first portion has an even number of 1s or bars, then the orientation processor determines that the first portion 410 corresponds to the right portion, and hence the barcode orientation is upside down relative to the device 104.

The orientation processor 202 may be configured to determine the barcode orientation based on a check of the first portion, the second portion, or both portions against the predefined coding rules. Further, the orientation processor 202 may be configured, after making a determination on the barcode orientation, to validate the barcode by performing a checksum and comparing the result against a checksum digit encoded in the barcode. Thus, if the checksum fails, the orientation processor 202 may conclude that the barcode orientation was not properly determined.

Other manners of determining the barcode orientation are also contemplated. For example, the coding rules may define asymmetric start and stop symbols or guards for the barcode, thereby enabling the orientation processor 202 to identify the direction to read the barcode, and hence the barcode orientation.

Figure 5:
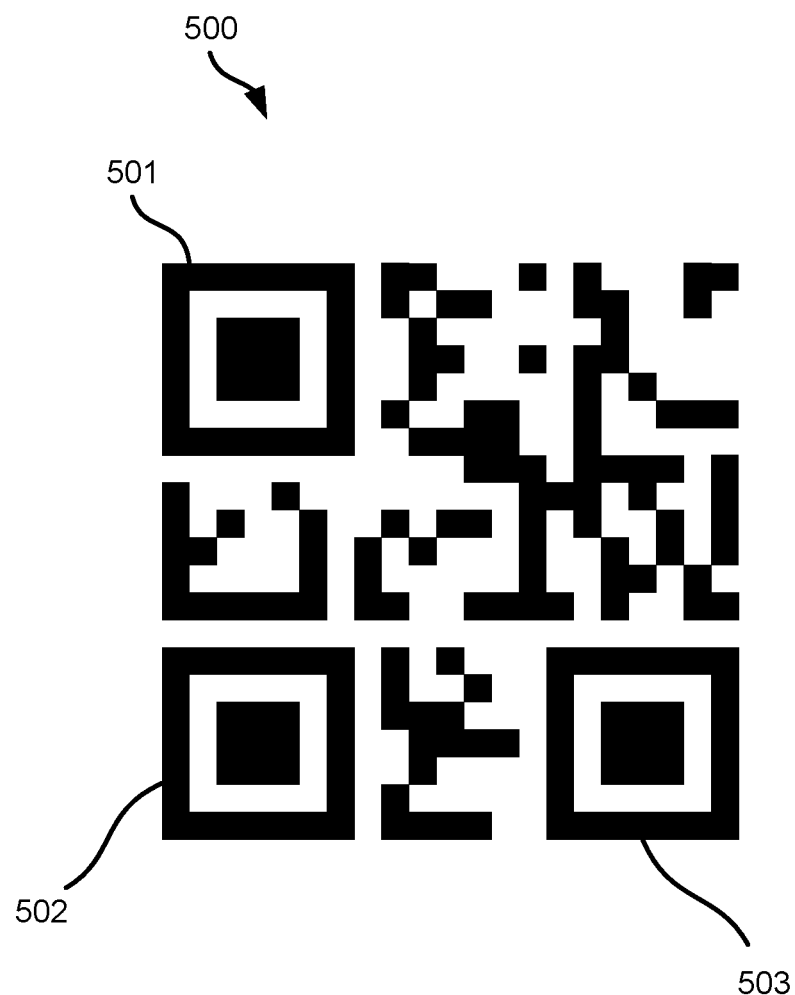
FIG. 5 is a schematic of a matrix barcode.

In another example, referring to FIG. 5, another example barcode 500 is depicted. The barcode 500 is a 2-dimensional or matrix barcode. The barcode 500 includes alignment patterns 501, 502, and 503. The orientation processor 202 may be configured to identify the alignment patterns 501, 502 and 503 based on the detected blocks and spaces in the predefined alignment pattern. Having identified the alignment patterns 501, 502, and 503, the orientation processor 202 may then determine whether the alignment patterns 501, 502, and 503 correspond to predefined alignment rules. For example, the alignment rules may indicate that the three alignment patterns 501, 502, and 503 are spatially located in the top-left, top-right, and bottom-left corners of the matrix barcode. Accordingly, the orientation processor 202 may determine that the barcode 500 has a barcode orientation that is rotated counterclockwise by 90° relative to the device 104.

Returning to FIG. 3, at block 320, the device 104, and in particular, the orientation processor 202 is configured to determine the object orientation based on the barcode orientation determined at block 315. For example, the orientation processor 202 may presume a simple correspondence between the barcode orientation and the object orientation. Thus, if the barcode orientation is determined to be upright, then the object orientation may also be determined to be upright.

In other examples, the barcode scanning device 104 itself may not be oriented upright when the barcode scanning operation is performed. For example, the device 104 may be rotated by an operator to scan a barcode that is placed vertically, that is on the top side or underside of an object, or the like. Accordingly, the barcode orientation obtained at block 315 may be a relative barcode orientation (i.e. relative to the device 104). Thus, at block 320, device 104, and in particular the orientation processor 202 may control the orientation sensor 224 to determine a device orientation for the device 104. The device 104 may then modify the barcode orientation according to the device orientation to obtain the object orientation.

Figure 6A:
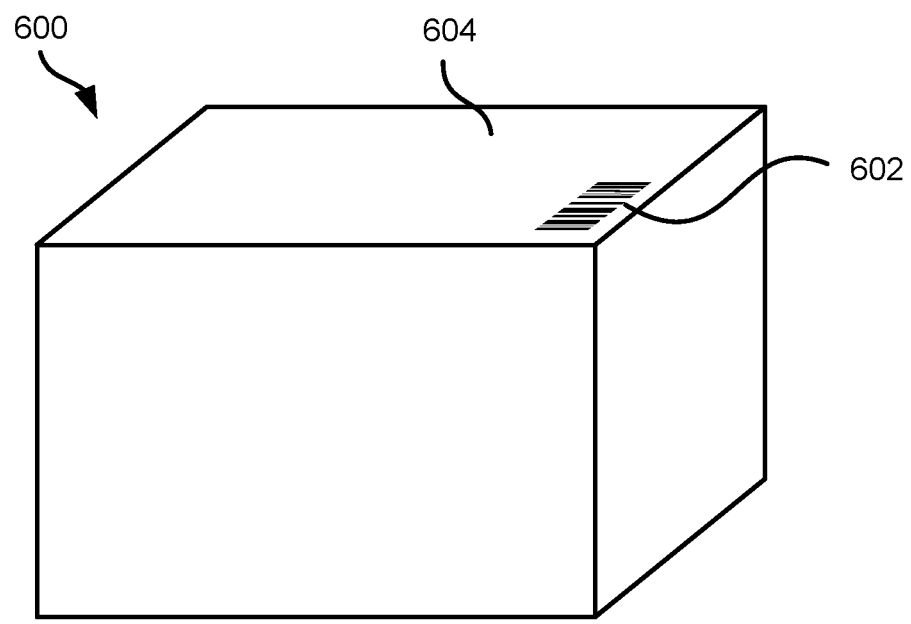
FIG. 6A is a schematic of an object with a barcode.
Figure 6B:
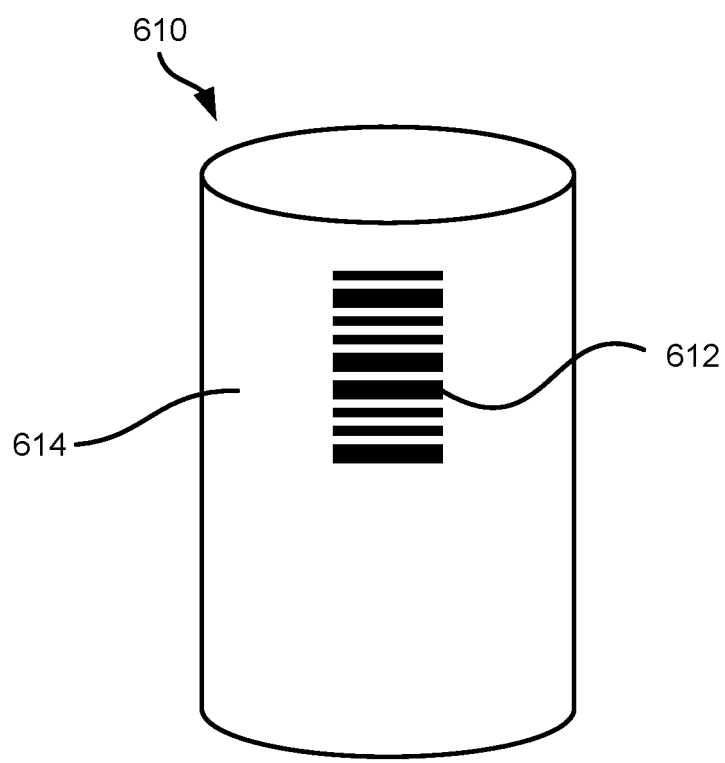
FIG. 6B is a schematic of an object with a barcode.

In further examples, the barcode 120 may be oriented on the object 122 in a manner that does not correspond with the object's orientation. For example, referring to FIG. 6A, an object 600 may have a barcode 602 on a top facing surface 604 of the object 600. This may be due to the object being large, heavy, or cumbersome to otherwise scan the barcode 602. In other examples, referring to FIG. 6B, a cylindrical object 610 having a curved surface 614 may have a barcode 612 oriented vertically (i.e. rotated 90°) on its curved surface 614 so as not to skew the widths of the bars and spaces in the barcode during a barcode scanning operation. Thus the placement of the barcodes may vary based on the object being scanned, in accordance with accepted barcode placement guidelines.

Accordingly, the orientation processor 202 may take into account the object classification when determining the object orientation. Specifically, the orientation processor 202 may obtain the identifier extracted by the decoding processor at block 310 and may retrieve relevant barcode placement guidelines based on the identifier. For example, the orientation processor 202 may retrieve the barcode placement guidelines from the repository 212 in the memory 204 of the barcode scanning device 104, or may communicate, via the communications interface 216, with the server 101 to retrieve the barcode placement guidelines.

The orientation processor 202 may then determine the object orientation based on the barcode orientation and the barcode placement guidelines. For example, the barcode placement guidelines may indicate that the barcode 602 is placed on the object 600 on the surface that ought to be its top facing surface 604. The orientation processor 202 may further determine, via the orientation sensor 224, that the device 104 was rotated such that the barcode scanning operation was performed in a downwards facing direction. In view of the barcode placement guidelines and the device orientation during the barcode scanning operation, the orientation processor 202 may conclude that the object orientation of the object 600 is upright.

In another example, the barcode placement guidelines that the object 610 has the barcode 612 on the curved surface 614, with the barcode 612 rotated counterclockwise by 90°. That is, the barcode 612 is oriented vertically on the curved surface 614, and read from the bottom to the top. The orientation processor 202 may further determine, via the orientation 224, that the device 104 was similarly rotated counterclockwise by 90° to scan the barcode 612. Thus, if the orientation processor 202 determines that the barcode orientation is upright relative to the device 104, the orientation processor 202 may further conclude, in view of the barcode placement guidelines and the device orientation during the barcode scanning operation, that the object orientation of the object 610 is upright. In contrast, if the orientation processor 202 determines that the barcode operation is upside down relative to the device 104, the orientation processor 202 may further conclude, in view of the barcode placement guidelines and the device orientation during the barcode scanning operation, that the object orientation of the object 610 is upside down.

Returning to FIG. 3, the device 104 may also be configured, at block 320, to output the object orientation. In particular, the device 104 may output an indication of the object orientation at the output device 220. For example, the output device 220 may include a display screen on which to display a visual indication of the object orientation, a sound generator, such as a speaker, configured to generate an audio indication of the object orientation, or a vibrator configured to generate a vibrational indication of the object orientation.

The device 104 may provide, as the indication, the results of the determination of object orientation, for example, displayed in written text. In further examples, the device 104 may display a visual representation of the object 122, for example based on object data received from the server 101. The visual representation may include an indication of the current object orientation and the correct object orientation.

In other examples, the device 104 may provide, as the indication, a binary signal based on whether the object orientation is upright or not. For example, the device 104 may display a first visual signal (e.g. a green light) indicating that the object orientation is upright, and a second visual signal (e.g. a red light) for all other object orientations. Alternately, the device 104 may provide an indication, such as generating a warning beep or causing the device 104 to vibrate, only when the object orientation is not upright.

Variations to the above systems and methods are contemplated. For example, the device 104 may further consider the object contents when providing the indication of the object orientation. For example, the device 104 may retrieve object data from the server 101 based on the identifier extracted at block 310. The object data may indicate, for example, whether the object 122 is fragile, symmetrical (hence not having an "upright" orientation) or other relevant object orientation data. Accordingly, the device 104 may provide a notification in relevant situations based on the determined object orientation and the object data.

In other examples, the device 104 may cooperate with a processing system, for example in a warehouse environment. In particular, the device 104 may communicate with the processing system to determine a corrective action based on the determined object orientation. For example, an object identified as not being oriented upright and requiring correction may be directed, via a conveyor belt system, to a separate area for its orientation to be corrected.

In some embodiments, the server 101 may be configured to perform some of the blocks of the method 300. For example, the device 104 may obtain the barcode data at block 305 and send the barcode data to the server 101 for further processing. The device 104 may also send device data, such as the device orientation to the server 101. The server 101 may then perform one or more of blocks 310 to 320, and return the object orientation to the device 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A barcode scanning device for determining an orientation of an object, the device comprising:
   a barcode reader;
   a decoding processor interconnected with the barcode reader, the decoding processor configured to:
      control the barcode reader to read a barcode on the object and generate barcode data representing the barcode; and
   an orientation processor interconnected with the decoding processor, the orientation processor configured to:
      receive the barcode data and determine a barcode orientation based on the barcode data;
      based on an object identifier encoded into the barcode data, retrieve barcode placement guidelines for the object;
      determine the object orientation based on the barcode orientation and the barcode placement guidelines for the object.

2. The barcode scanning device of claim 1, wherein the orientation processor is configured to determine the barcode orientation by:
   identifying a first portion of the barcode data, the first portion located between a first end guard and a center guard of the barcode; and
   when the first portion corresponds to predefined coding rules a portion of the barcode data left of the center guard, determining that the barcode orientation is upright relative to the barcode scanning device.

3. The barcode scanning device of claim 1, wherein the orientation processor is configured to determine the barcode orientation by:
   identifying one or more alignment patterns of the barcode; and
   when the one or more identified alignment patterns correspond to predefined alignment rules, determining that the barcode orientation is upright relative to the barcode scanning device.

4. The barcode scanning device of claim 1, further comprising an orientation sensor configured to determine an orientation of the barcode scanning device; and wherein the orientation processor is configured to determine the orientation of the object based on (a) the orientation of the barcode scanning device and (b) orientation of the barcode relative to the barcode scanning device.

5. The barcode scanning device of claim 1, further comprising one or more of: a display screen to display a visual indication of the object orientation, a sound generator to generate an audio indication of the object orientation, and a vibrator to generate a vibrational indication of the object orientation.

6. The barcode scanning device of claim 1, wherein the orientation processor is integrated with the decoding processor.

7. The barcode scanning device of claim 1, wherein the barcode reader comprises:
   laser disposed on the device, the laser configured to scan a laser beam across the barcode; and
   a sensor disposed on the device, the sensor configured to detect a reflected signal from the laser beam to generate barcode data representing the barcode based on the reflected signal.

8. A method, in a barcode scanning device, of determining an orientation of an object, the method comprising:
   reading a barcode on the object and generating barcode data representing the barcode;
   determining a barcode orientation based on the barcode data;
   based on an object identifier encoded into the barcode data, retrieving barcode placement guidelines for the object;
   determining the object orientation based on the barcode orientation and the barcode placement guidelines for the object.

9. The method of claim 8, wherein determining the barcode orientation comprises:
   identifying a first portion of the barcode data, the first portion located between a first end guard and a center guard of the barcode; and
   when the first portion adheres to predefined coding rules for a portion of the barcode data left of the center guard, determining that the barcode orientation is upright relative to the barcode scanning device.

10. The method of claim 8, wherein determining the barcode orientation comprises:
    identifying one or more alignment patterns of the barcode; and
    when the one or more identified alignment patterns adhere to predefined alignment rules, determining that the barcode orientation is upright relative to the barcode scanning device.

11. The method of claim 8, further comprising
    determining an orientation of the barcode scanning device; and
    determining the orientation of the object based on (a) the orientation of the barcode scanning device and (b) orientation of the barcode relative to the barcode scanning device.

12. The method of claim 8, wherein outputting the object orientation comprises one or more of:
    displaying a visual indication of the object orientation on a display screen of the barcode scanning device;
    generating an audio indication of the object orientation at a sound generator of the barcode scanning device; and
    generating a vibrational indication of the object orientation at a vibrator of the barcode scanning device.

13. A non-transitory computer-readable medium storing a plurality of computer-readable instructions executable by a controller, wherein execution of the instructions configures the controller to:
    read a barcode on the object and generate barcode data representing the barcode;
    determine a barcode orientation based on the barcode data;

based on an object identifier encoded into the barcode data, retrieve barcode placement guidelines for the object determine an orientation of the object based on the barcode orientation and the barcode placement guidelines for the object.

14. The non-transitory computer-readable medium of claim 13, wherein execution of the instructions configures the controller to determine the barcode orientation by:

identifying a first portion of the barcode data, the first portion located between a first end guard and a center guard of the barcode; and when the first portion adheres to predefined coding rules for a portion of the barcode data left of the center guard, determining that the barcode orientation is upright relative to a barcode scanning device.

15. The non-transitory computer-readable medium of claim 13, wherein execution of the instructions configures the controller to determine the barcode orientation by:

identifying one or more alignment patterns of the barcode; and when the one or more identified alignment patterns adhere to predefined alignment rules, determining that the barcode orientation is upright relative to a barcode scanning device.

16. The non-transitory computer-readable medium of claim 13, wherein execution of the instructions configures the controller to:

determine orientation of a barcode scanning device; and determine the orientation of the object based on (a) the orientation of the barcode scanning device and (b) orientation of the barcode relative to the barcode scanning device.

17. The non-transitory computer-readable medium of claim 13, execution of the instructions configures the controller to output the object orientation by one or more of:

displaying a visual indication of the object orientation on a display screen of the barcode scanning device;

generating an audio indication of the object orientation at a sound generator of the barcode scanning device; and generating a vibrational indication of the object orientation at a vibrator of the barcode scanning device.

* * * * *